United States Patent
Gurevich et al.

(10) Patent No.: US 7,274,418 B2
(45) Date of Patent: Sep. 25, 2007

(54) METHOD AND SYSTEM FOR IMPROVING THE CONTRAST OF LCDS USING CIRCULAR POLARIZATION

(75) Inventors: Vladimir Gurevich, Stony Brook, NY (US); Mark Krichever, Hauppauge, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 76 days.

(21) Appl. No.: 10/690,388

(22) Filed: Oct. 21, 2003

(65) Prior Publication Data

US 2005/0083451 A1    Apr. 21, 2005

(51) Int. Cl.
*G02F 1/1335* (2006.01)

(52) U.S. Cl. .......................... 349/98; 349/114; 349/12; 349/117

(58) Field of Classification Search ................. 349/98, 349/114, 113, 117, 12, 65, 61–63
See application file for complete search history.

(56) References Cited

U.S. PATENT DOCUMENTS

| | | | | |
|---|---|---|---|---|
| 4,093,356 A | * | 6/1978 | Bigelow | 349/114 |
| 4,991,941 A | * | 2/1991 | Kalmanash | 349/33 |
| 5,548,108 A | * | 8/1996 | Moldskred et al. | 235/462 |
| 6,091,462 A | * | 7/2000 | Sharp et al. | 349/19 |
| 6,462,805 B1 | * | 10/2002 | Wu et al. | 349/169 |
| 6,618,113 B1 | * | 9/2003 | Ulrich et al. | 349/156 |
| 6,628,369 B2 | * | 9/2003 | Kumagai et al. | 349/194 |
| 6,642,977 B2 | * | 11/2003 | Kotchick et al. | 349/96 |
| 6,707,519 B1 | * | 3/2004 | Okumura et al. | 349/114 |
| 6,738,117 B2 | * | 5/2004 | Minakuchi | 349/118 |
| 6,801,283 B2 | * | 10/2004 | Koyama et al. | 349/119 |
| 6,853,421 B2 | * | 2/2005 | Sakamoto et al. | 349/114 |
| 6,891,584 B1 | * | 5/2005 | Kashima | 349/98 |
| 2002/0012085 A1 | * | 1/2002 | Honda et al. | 349/112 |
| 2002/0030776 A1 | * | 3/2002 | Khan et al. | 349/114 |
| 2003/0001993 A1 | * | 1/2003 | Iijima | 349/113 |
| 2004/0257498 A1 | * | 12/2004 | Usaka et al. | 349/98 |

* cited by examiner

*Primary Examiner*—Mike Qi
(74) *Attorney, Agent, or Firm*—Fay Kaplun & Marcin, LLP

(57) ABSTRACT

A display device displays images with reduced glare from external incident light. The device includes a back light located on a bottom surface of the display device to provide internal light. Moreover, the device includes an internal circular X-polarizer located external to the back light to circularly polarize internal light. In addition, the device includes a mirror to reflect external incident light. Furthermore, the device includes a liquid crystal display located external to the mirror and the internal circular X-polarizer to display images. The device also includes an external circular X-polarizer located external to the liquid crystal display to circularly polarize external incident light, and absorb reflected external incident light and polarized internal light.

23 Claims, 6 Drawing Sheets

White Screen

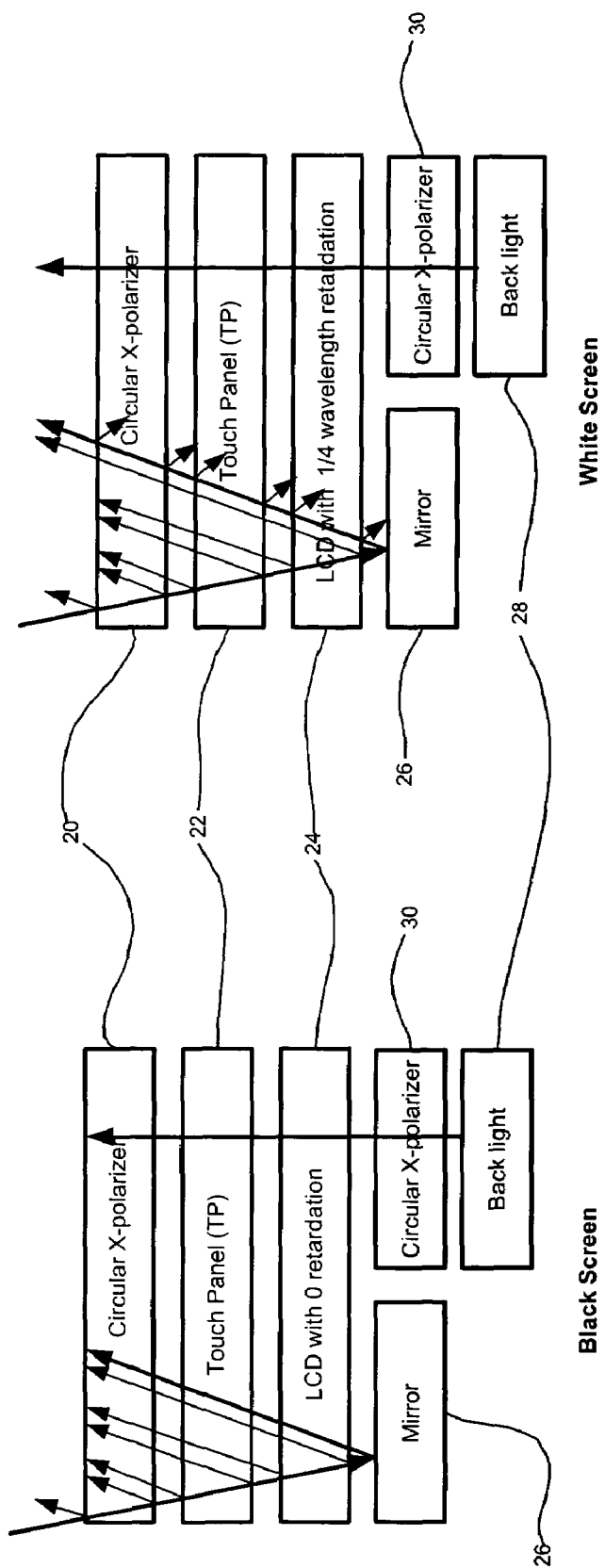

METHOD AND SYSTEM FOR IMPROVING THE CONTRAST OF LCDS USING CIRCULAR POLARIZATION

BACKGROUND

As computing becomes more mobile, the areas in which computing devices such as laptops, PDAs, pagers, etc., are used is ever increasing. However, an application is only useful if it can provide information to the user in an intelligible manner. The conditions under which known displays can be used are limited by limitations in their ability to be read when there is too much or too little light. Even when conditions are not severe enough to prevent reading the displays, problems such as glare and light loss may reduce the effectiveness of such displays. These conditions are especially prevalent in outdoor applications. Glare occurs when light reflected from display components causes increased luminance of black screen pixels and decreases overall contrast. Light loss may occur where the light path involves a high number of passes through a polarizer, with each pass resulting in the absorption of a portion of the available light. Glare is especially problematic for touch screens, since such screens require an additional component which also reflects a portion of the light incident thereon.

SUMMARY OF THE INVENTION

A display device displays images with reduced glare from external incident light. The device includes a back light located on a bottom surface of the display device to provide internal light. Moreover, the device includes an internal circular X-polarizer located external to the back light to circularly polarize internal light. In addition, the device includes a mirror to reflect external incident light. Furthermore, the device includes a liquid crystal display located external to the mirror and the internal circular X-polarizer to display images. The device also includes an external circular X-polarizer located external to the liquid crystal display to circularly polarize external incident light, and absorb reflected external incident light and polarized internal light.

A method for reducing glare in a display device by generating and transmitting light using a back light from within the display device toward an external surface thereof. In addition, the method reduces glare by circularly polarizing transmitted light using a first circular X-polarizer external to the back light. The method also involves circularly polarizing external incident light using a second circular X-polarizer external to the first circular X-polarizer. Moreover, the method involves reflecting external incident light using a mirror internal to the first circular X-polarizer. Furthermore, the method reduces glare by absorbing reflected external incident light and transmitted light using the second circular X-polarizer.

BRIEF DESCRIPTION OF THE DRAWINGS

FIG. 1 shows an exemplary transflective display with a touch panel according to the present invention with light-ray paths in a black-screen mode;

FIG. 2 shows an exemplary transflective display with a touch panel according to the present invention with light-ray paths in a white-screen mode;

DETAILED DESCRIPTION

Figure 3:
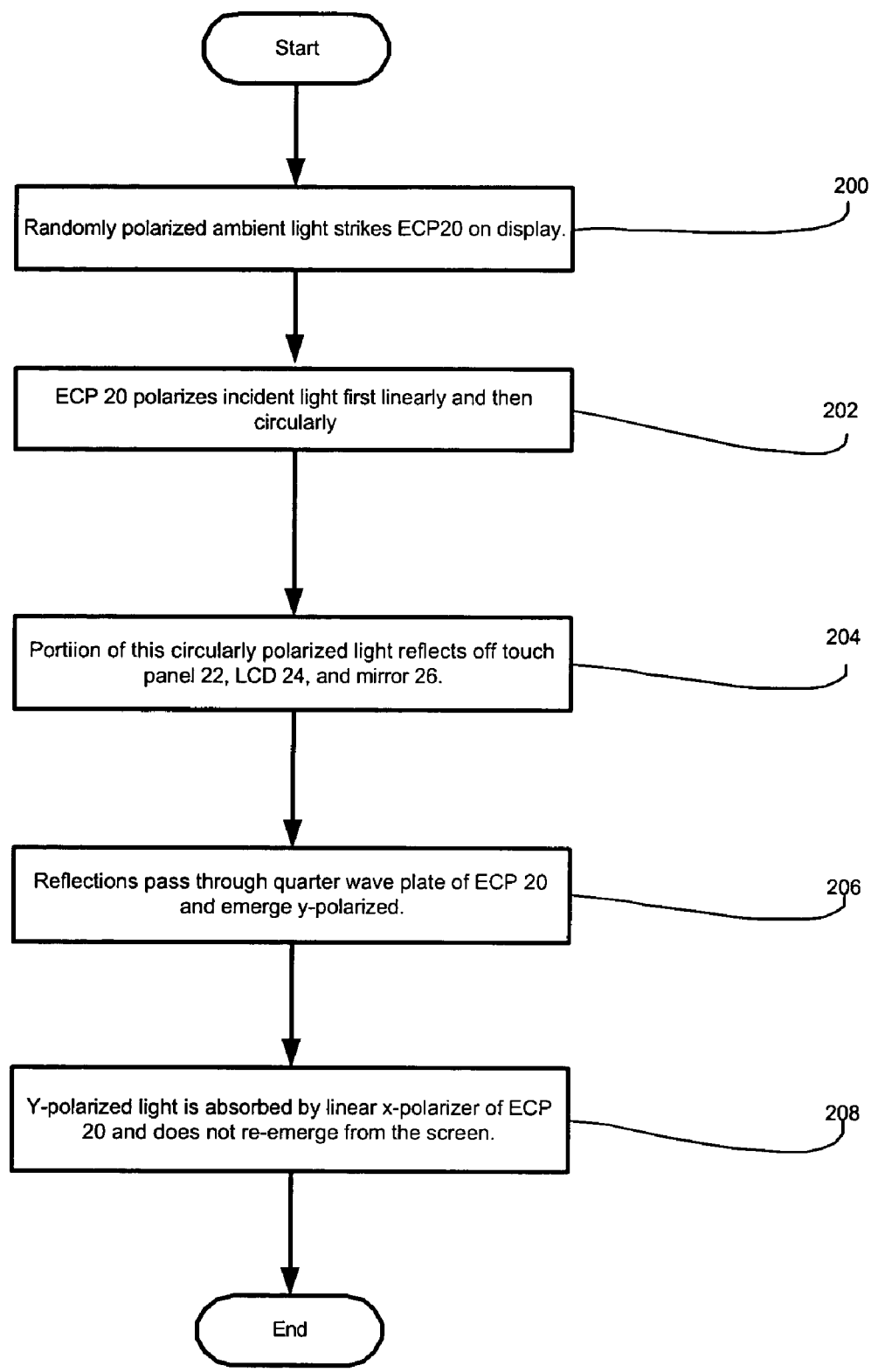
FIG. 3 shows an exemplary method by which the present invention may achieve decreased black screen luminance in a reflective mode.

The present invention may be further understood with reference to the following description and the appended drawings, wherein like elements are referred to with the same reference numerals. Transflective displays are often asked to operate in a variety of external light conditions ranging from complete darkness to bright outdoor light. When the external light is sufficient to illuminate the display, a reflective surface (such as a mirror) located on the back of the display reflects this external light, using a combination of linear polarizers and LCD pixels to illuminate desired portions of the display. When the external light is insufficient to adequately illuminate the display, a back light, also located on the back of the display, serves as a source of light for the LCD.

FIG. 1 shows an exemplary transflective display with a touch panel according to the present invention. The light rays are shown following pathways which would result from the display being configured for a black screen. This display may consist of an external circular X-polarizer ("ECP") 20 which constitutes an outermost layer of the display. Internal to this polarizer 20 a touch panel ("TP") 22 may be positioned to enable users to interact with the display for a multitude of functions. An LCD 24 is located internal to the TP 22. Internal to the LCD 24 is a mirror 26 which reflects external light in order to illuminate the display. Internal to the LCD 24 and next to the mirror 26 may be an internal circular X-polarizer ("ICP") 30. A back light 28 is positioned beneath the ICP 30 for generating light in transmissive mode to illuminate the display. Each of the ECP 20 and the ICP 30 includes a linear X-polarizer in combination with a quarter wave plate.

FIG. 2 also shows an exemplary transflective display with a touch panel according to the present invention. The components and their orientations relative to one another are identical to those shown in FIG. 1, except that the light rays are shown following pathways which would result from the display being configured for a white screen. This configuration is accomplished by setting the LCD to quarter-wave retardation, which accomplishes an additional ninety degree phase-shift of the light moving from the surface of display to the mirror 2 and toward the surface of the display from back light 28. The present invention may be also used in a reflective display, where the ICP 30 and back light 28 are eliminated and replaced with a front light.

FIG. 3 shows an exemplary method by which the present invention decreases black screen luminance and increases contrast in a reflective mode. In step 200, randomly polarized external light is incident upon the outermost layer of the display (e.g., the ECP 20). The linear X-polarizer of the ECP 20 may, for example, be positioned on an outer surface thereof with the quarter wave plate on an inner surface. In step 202, this incident light is first X-polarized and then circularly polarized as it passes through the ECP 20.

In step 204, this circularly polarized light continues further into the display, passing through the touch panel 22 and the LCD 24, and reflecting off the mirror 26 on the back of the display. As this light passes inward through the display, portions of the light may be reflected back towards the surface of the display at each of the layers thereof as the light crosses the interfaces between display layers. Those skilled in the art will understand passage through the LCD 24 does not change the polarization of the light because the LCD 24 may be set to zero retardation.

In step 206, the reflected light strikes the inner surface of the ECP 20 (i.e., the quarter wave plate thereof) and the circularly polarized reflected light is transformed into Y-polarized light. In step 208, this Y-polarized light is absorbed by the linear X-polarizer which constitutes the external layer of the ECP 20 so that the light reflected from inside the display does not escape the display via the outer surface of the ECP 20, thus the brightness of the black screen is decreased and hence the glare generated by the reflected light.

Figure 4:
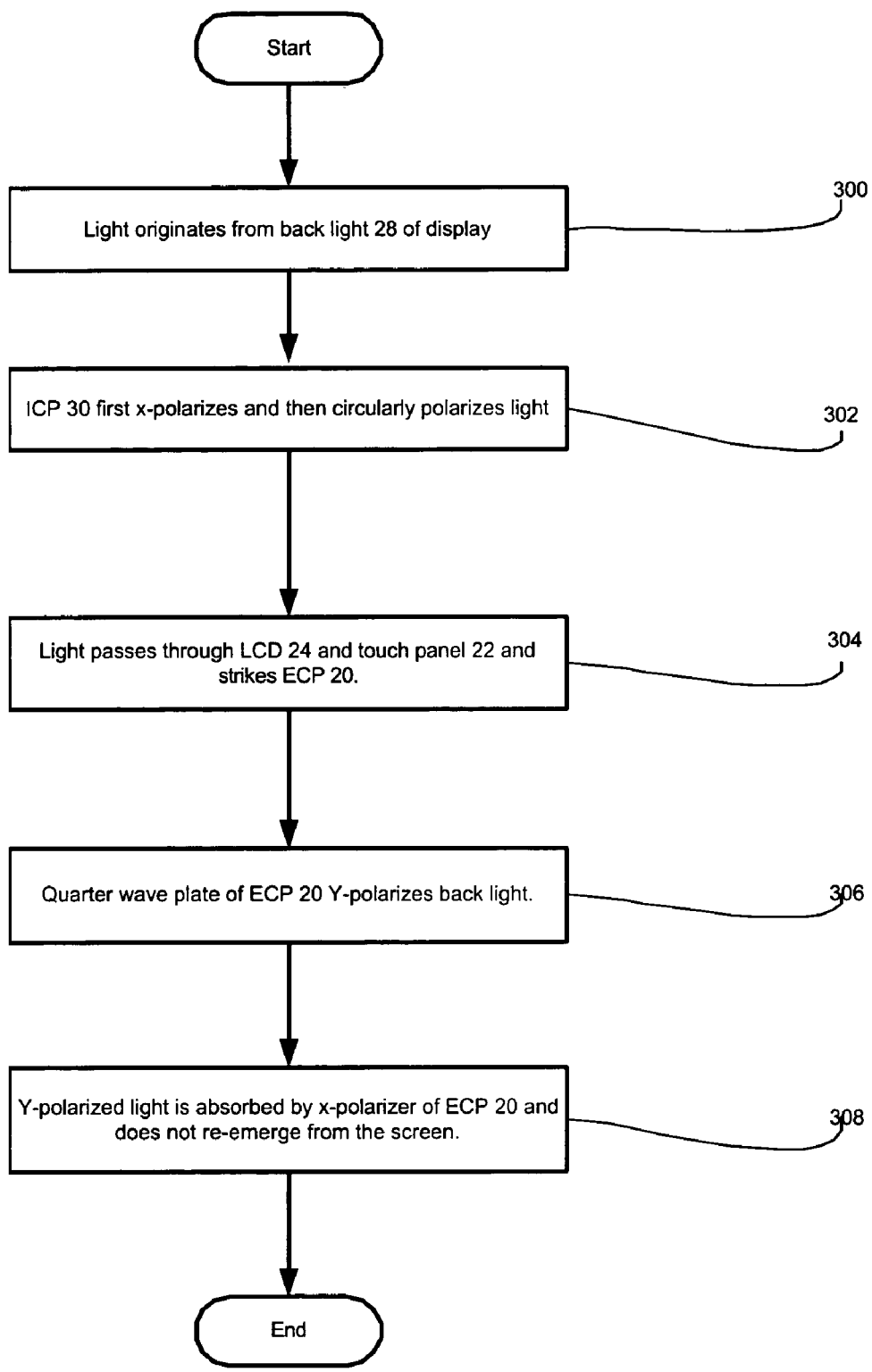
FIG. 4 shows an exemplary method by which the present invention may achieve decreased black screen luminance in a transmissive mode.

FIG. 4 shows an exemplary method by which the present invention decreases black screen luminance in a transmissive mode using an internal light source 28. In step 300, light originates from a back light 28 located on an inner-most layer of the display. In step 302, this light is X-polarized and then circularly polarized by an internal circular X-polarizer ("ICP") 30. This circularly polarized light then travels in step 304 through the LCD 24 and touch panel 22 layers of the display to strike an internal surface of the external circular X-polarizer ("ECP") 20. In step 306, the quarter wave plate in ECP 20 first transforms the circularly polarized light into Y-polarized light. In step 308, this Y-polarized light is absorbed by the linear X-polarizer component of ECP 20.

Figure 5:
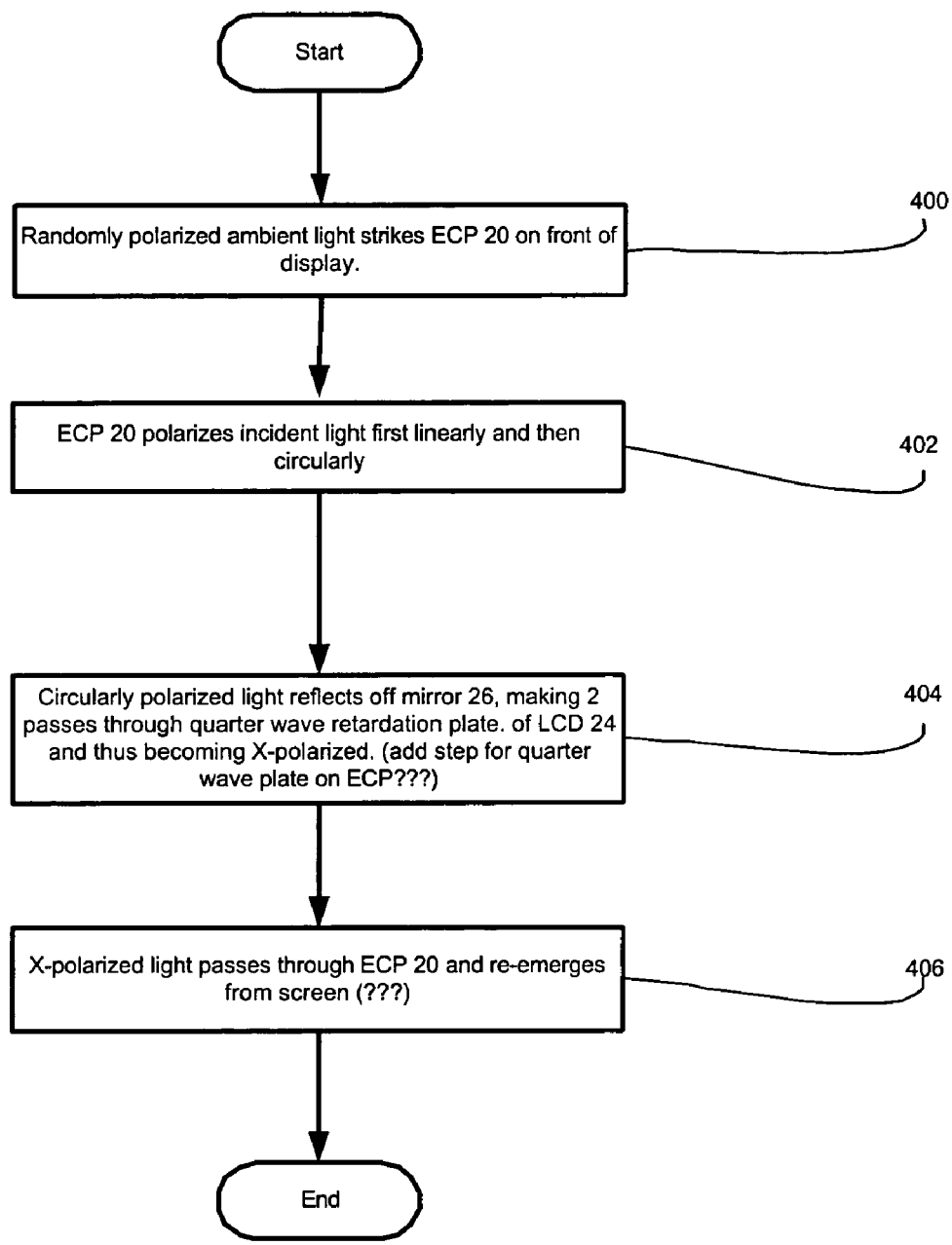
FIG. 5 shows an exemplary method by which the present invention may achieve increased white screen luminance in a reflective mode.

FIG. 5 shows an exemplary method by which the present invention increases white screen luminance in a reflective mode. In step 400, randomly polarized external light is incident upon ECP 20 which forms the outermost layer of the display.

In step 402, this incident light is first X-polarized and then circularly polarized as it passes through ECP 20. This circularly polarized light passes through the touch panel 22 and LCD 24 layers of the display until it reflects off of the mirror 26 on the back of the display.

In step 404, this light is X-polarized as it passes back through the quarter wave retardation plate of the LCD 24. This light becomes X-polarized after four passes through the LCD 24, namely two passes as the light is traveling toward the mirror 26 and two passes as the light is traveling in the reverse direction after being reflected.

In step 406, this light re-emerges from the display. Because it is X-polarized it is not absorbed by the X-polarizer which makes up the outer layer of external circular X-polarizer 20. This X-polarization is achieved by the two additional passes of the light through the quarter wave retardation plate of the LCD 24.

Figure 6:
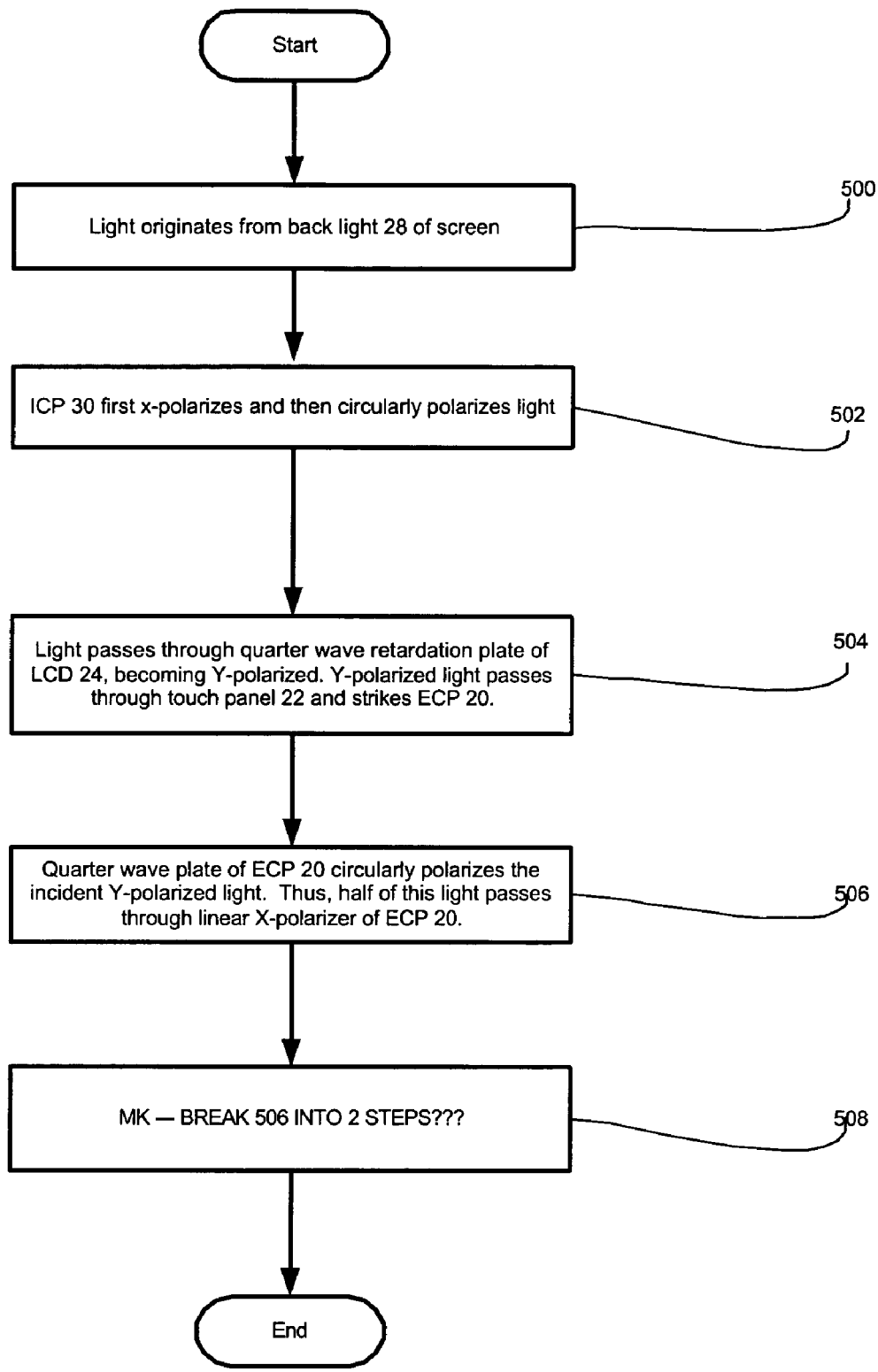
FIG. 6 shows an exemplary method by which the present invention may achieve increased white screen luminance in a transmissive mode.

FIG. 6 shows an exemplary method by which the present invention increases white screen luminance in transmissive mode using an internal light source 28. In step 500, the light originates from a back light 28 located on an inner-most layer of the display.

In step 502, this light is X-polarized and then circularly polarized by the internal circular X-polarizer ("ICP") 30. This circularly polarized light then travels in step 504 through the LCD 24 set to quarter wave retardation. Due to this retardation, the circularly polarized light becomes Y-polarized. This Y-polarized light then passes through the touch panel 22 and strikes the external circular X-polarizer 20.

In step 506, the Y-polarized light passes through the ECP 20. As it passes through the quarter-wave plate of the ECP 20, it becomes circularly polarized. The light then passes through the linear X-polarizer. Due to its circular polarization, only one-half of the light will be transmitted through the X-polarizer.

The system and method of the present invention, described in detail above, possess several advantages over conventional LCDs which use linear polarization. First, the use of an external circular X-polarizer 20 to absorb reflections of light from internal layers results in decreased black screen luminance and hence increased contrast. Second, because the white screen light path makes only two passes through polarizers instead of the four passes made in prior art LCDs using linear polarization, there is a decreased loss of light along the path. This results in increased luminance of the white screen and increased contrast.

Figure 7:
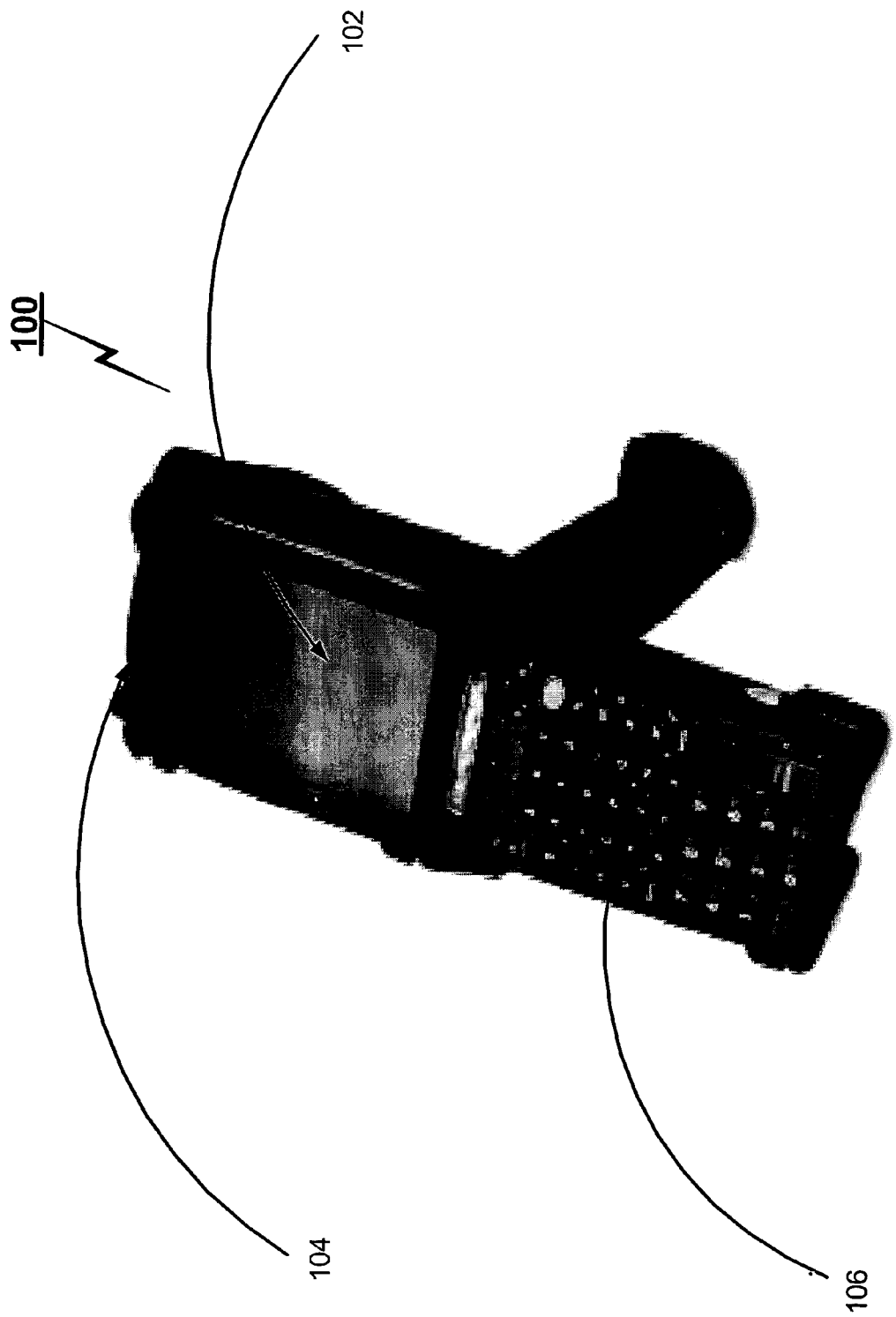
FIG. 7 shown an exemplary computing device utilizing the transflective display according to the present invention.

Those skilled in the art will understand that the transflective display according to the present invention may be utilized in a number of computing/electronic devices, such as laptops, PDAs, pagers, monitors, etc. For example, such a transflective display may be utilized in a mobile computing device as shown in FIG. 7. In particular, FIG. 7 shows an exemplary computing device 100 which utilizes the transflective display 102 according to the present invention. The device 100 may be a handheld mobile computer. The device 100 may be utilized for data capturing functions (e.g., reading barcodes, RFID tags, images, etc.) using a data capturing arrangement 104. The device 100 may also include an input arrangement 106 which allows the user to enter data into the device 100. In addition, the device 100 may communicate to further devices using a wireless communication arrangement (not shown).

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A device for displaying images comprising:
   a back light within the device for generating light and transmitting light from within the device toward an external surface thereof;
   a first circular X-polarizer having a first side adjacent to a first side of the back light;
   a liquid crystal display set to quarter-wave retardation having a first side adjacent to a second side of the first circular X-polarizer;
   a mirror having a first side adjacent to the first side of the liquid crystal display; and
   a second circular X-polarizer having a first side adjacent to a second side of the liquid crystal display.

2. The device for display images as recited in claim 1, further comprising a touch pad interposed between the liquid crystal display and the second circular X-polarizer.

3. The device for displaying images as recited in claim 1, wherein the device is a transflective display.

4. The device for displaying images as recited in claim 1, wherein the device is a reflective display.

5. The device for displaying images as recited in claim 4, wherein the reflective display includes a front light.

6. The device for displaying images as recited in claim 1, wherein the first circular X-polarizer includes a linear X-polarizer on an outer surface thereof and a quarter-wave plate on an inner surface thereof.

7. The device for displaying images as recited in claim 1, wherein the second circular X-polarizer includes a linear X-polarizer on an outer surface thereof and a quarter-wave plate on an inner surface thereof.

8. The device for displaying images as recited in claim 1, wherein the mirror is a two-way mirror.

9. A method for reducing glare in a display device comprising of:
   generating and transmitting light using a back light from within the display device toward an external surface thereof;
   circularly polarizing transmitted light using a first circular X-polarizer having a first side adjacent to a first side of the back light;
   circularly polarizing external incident light using a second circular X-polarizer having a first side adjacent to a second side of the first circular X-polarizer;
   reflecting external incident light using a mirror having a first side adjacent to the first side of the second circular X-polarizer; and
   absorbing reflected external incident light and transmitted light using the second circular X-polarizer; and
   generating images using a liquid crystal display set to quarter wave retardation interposed between the second circular X-polarizer and the first circular X-polarizer.

10. The method according to claim 9, wherein the display device includes a touch pad interposed between the liquid crystal display and the second circular X-polarizer.

11. The method according to claim 9, wherein the display device is a transflective display.

12. The method according to claim 9, wherein the display device is a reflective display.

13. The method according to claim 12, wherein the reflective display includes a front light.

14. The method according to claim 9, wherein the first circular X-polarizer includes a linear X-polarizer on an outer surface thereof and a quarter-wave plate on an inner surface thereof.

15. The method according to claim 9, wherein the second circular X-polarizer includes a linear X-polarizer on an outer surface thereof and a quarter-wave plate on an inner surface thereof.

16. The method according to claim 9, wherein the mirror is a two-way mirror.

17. A transflective display device to display images with reduced glare from external incident light comprising:
   a back light located on a bottom surface of the display device to provide internal light;
   an internal circular X-polarizer having a first side adjacent to a first side of the back light to circularly polarize internal light;
   a mirror to reflect external incident light;
   a liquid crystal display set to quarter wave retardation having a first side adjacent to a first side of the mirror and a second side of the internal circular X-polarizer to display images; and
   an external circular X-polarizer having a first side adjacent to a second side of the liquid crystal display to circularly polarize external incident light and absorb reflected external incident light and polarized internal light.

18. A computing device, comprising:
   a processor processing data; and
   a display device displaying the data, the display device including a back light situated within the display device for generating light and transmitting light from within the device toward an external surface thereof, the display device further including a first circular X-polarizer situated between the back light and the external surface, a liquid crystal display set to quarter wave retardation situated between the first circular X-polarizer and the external surface, a mirror adjacent to the liquid crystal display and a second circular X-polarizer situated between the liquid crystal display and the external surface.

19. The computing device according to claim 18, wherein the computing device is a mobile computing device.

20. The computing device according to claim 19, further comprising:
   a wireless communication arrangement communicating with a further computing device.

21. The computing device according to claim 18, further comprising:
   a data capturing arrangement obtaining the data.

22. The computing device according to claim 21, wherein the data capturing arrangement includes at least one of a barcode reader and an RFID reader.

23. A device for displaying images comprising:
   a back light within the device for generating light and transmitting light from within the device toward an external surface thereof;
   a first circular X-polarizer situated between the back light and the external surface;
   a liquid crystal display set to quarter wave retardation situated between the first circular X-polarizer and the external surface;
   a mirror adjacent to a first portion of the liquid crystal display, the first circular X-polarizer adjacent to a second portion of the liquid crystal display; and
   a second circular X-polarizer situated between the liquid crystal display and the external surface.

* * * * *